Jan. 17, 1961 S. D. HUTT ET AL 2,968,687
BATTERY CELL AND METHOD OF MANUFACTURE
Filed June 17, 1958

INVENTORS
STANLEY D. HUTT
DONALD M. SMYTH
MATTHEW F. STEFANSKI

BY *Connolly and Hutz*

THEIR ATTORNEYS

United States Patent Office 2,968,687
Patented Jan. 17, 1961

2,968,687

BATTERY CELL AND METHOD OF MANUFACTURE

Stanley D. Hutt and Donald M. Smyth, Williamstown, and Matthew F. Stefanski, Adams, Mass., assignors to Sprague Electric Company, North Adams, Mass., a corporation of Massachusetts Filed June 17, 1958, Ser. No. 742,555

15 Claims. (Cl. 136—87)

This invention relates to a novel structure for a solid electrolyte battery cell and its method of manufacture, and more particularly relates to a solid electrolyte battery cell which is encased within a cup-shaped anode.

Commonly assigned, co-pending application S.N. 657,178, filed May 6, 1957, described a solid electrolyte battery cell in which the cathode material is deposited within a cup-shaped anode coated by a barrier-electrolyte layer. The anode cup is sealed by a plug through which a tightly fitting conductive lead extends into electrical contact with the cathode material. In a form of the invention described in that application, a series-connected array of these cells is formed, for example, by connecting the lead extending through the plug of one cell to the base of the anode cup of the preceding cell. This connection is therein made, for example, by spot welding or conductive cement; or the lead is force fitted into a cylindrical indentation previously formed in the base of the preceding cell.

These connections are fairly easy to manufacture, but they require that a spot on the base of the anode cup be maintained free of the solid-barrier-electrolyte layer, and they are prone to disruption if the cell is subjected to shock and vibration during shipping or service.

An object of this invention is to provide a structure for a solid electrolyte battery cell which securely fastens a conductive lead to the base of a cup-shaped anode and a method of consistently providing such a structure.

In accordance with this invention, a rounded longitudinal indentation of relatively large area is formed in the base of the cup-shaped anode. The walls of the cup-shaped anode adjacent its base are then deformed radially inwardly at spaced intervals to form indentations which crimp closed the rounded indentation or dimple in its base. This crimping may be accomplished in one operation if the cathode mixture is excluded from the crimped area, or it may be done in two steps with the cathode mixture being inserted after the preliminary crimping and before the final crimping. This two-step crimping minimizes the squeezing out of cathode material and plug from the cup, and it helps avoid damaging the barrier-electrolyte coating which is applied to the cup after the preliminary crimping operation is performed.

A partially crimped can is coated with a solid barrier-electrolyte layer. For example, a silver anode cup is tarnished in chlorine vapor to provide a silver chloride barrier-electrolyte coating upon it. The cathode material is then inserted within the anode. After the cathode material is sealed by a plug having a conductive lead passing through it into the cathode material, a number of cells are assembled end-to-end with the conductive lead of each cell inserted within the partially crimped indentation in the base of the preceding cell. The spaced radial indentations around the base of the cell are then forced radially inwardly until they firmly wedge or crimp the conductive lead within the base of the anode cup. The force developed during this final crimping operation squeezes the barrier-electrolyte layer out from between the lead wire and anode material to provide an intimate electrically conductive connection between them.

The internal solid electrolyte barrier may be broken within the area deformed during the final crimping operation. An insulating substance may, accordingly, be deposited within the deformed portion of the anode before the cathode material is inserted and before the final crimping operation is performed to insure that any bare portions of the anode are not bridged or short-circuited by conductive particles incorporated in the cathode mixture. This insulating material may, for example, be identical to the solid electrolyte barrier layer. It may also consist of active cathode material without the usual conductive additive, or it may consist of any effective insulating material.

Novel features and advantages of the present invention will become apparent to one skilled in the art from a reading of the following description in conjunction with the accompanying drawings wherein similar reference characters refer to similar parts and in which.

Figure 1:
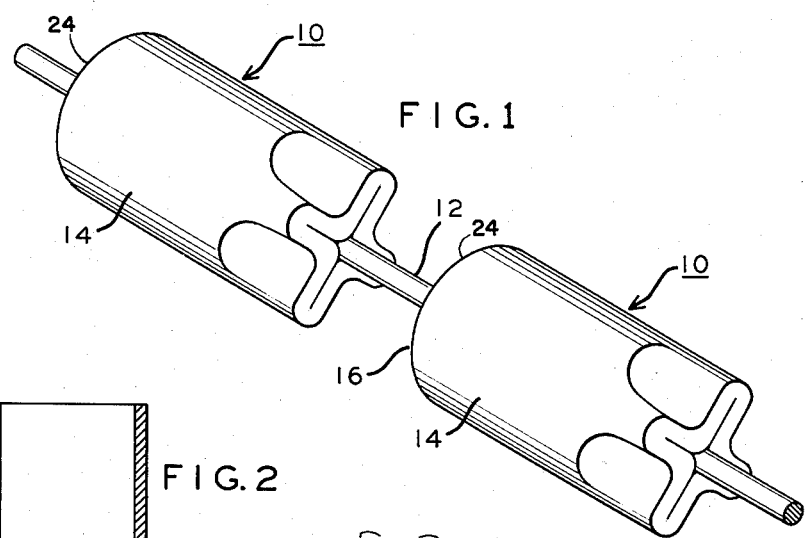
Fig. 1 is a perspective view of one embodiment of this invention.
Figure 7:
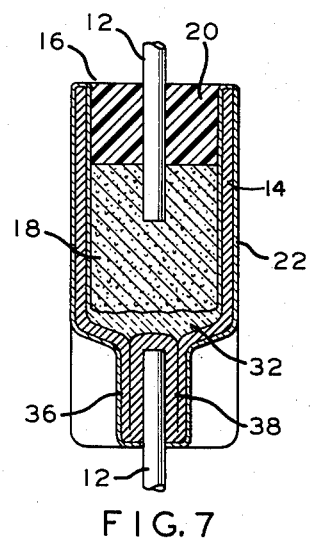
Fig. 7 is a cross-sectional view taken through Fig. 6 along the line 7—7 and looking in the direction of the arrows.

In Fig. 1 is shown a series-connected array of solid electrolyte battery cells 10 in which conductive leads 12 are connected to the bases 24, cup-shaped anodes 14 and inserted through open ends or mouths 16 of the following cup-shaped anode 14 into cathode material 18 of the following cells through plugs 20 as shown in Fig. 7.

Figure 2:
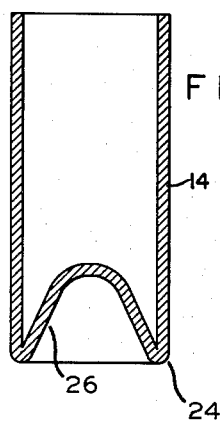
Fig. 2 is a cross-sectional view in elevation of a portion of the embodiment shown in Fig. 1 in a preliminary manufacturing stage.
Figure 3:
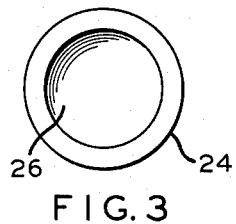
Fig. 3 is a bottom plan view of the portion shown in Fig. 2.

Cup-shaped anode 14, shown in Fig. 2 is made, for example, from a silver can approximately 0.200 inch long and 0.060 inch in outside diameter. First, as shown in Figs. 2 and 3, a rounded indentation or dimple 26 is formed, for example, in the center of the base 24 of anode 14.

Figure 4:
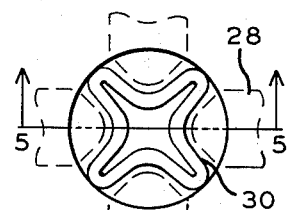
Fig. 4 is a bottom plan view of the portion of the embodiment shown in Fig. 3 during a preliminary deforming operation.

After indentation or dimple 26 is formed, a preliminary deforming or crimping operation is performed, for example, by the jaws 28 of a conventional four-jawed chuck as shown in Fig. 4. Limited spaced portions about the circumference of the base of cup-shaped anode 14 are grasped between jaws 28 to confine the crimping effect to the portion of the cup surrounding indentation 26. In this preliminary crimping or deforming operation, radial indentations 30 are formed which close, for example, approximately 75% of the space required for receiving a conductive lead 12.

After the preliminary crimping operation shown in Fig. 4 is completed, anode can 14 is coated with a layer 22 of barrier-electrolyte material (Fig. 5), for example, silver chloride by tarnishing silver can 14 in chlorine vapor. Coating cup 14 after preliminary crimping minimizes the danger of breaking the barrier-electrolyte layer while the anode cup 14 is being crimped. There is no necessity of leaving a bare spot on the base of can 14 for electrical connection to the lead to be attached thereto because the final crimping operation squeezes any of the insulating barrier-electrolyte coating out from between the conductive anode can and lead.

Figure 5:
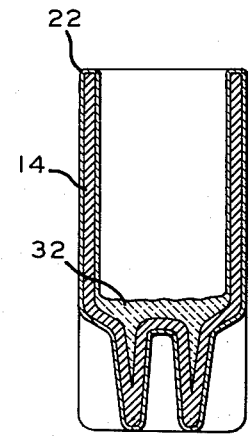
Fig. 5 is a cross-sectional view in elevation taken through Fig. 4 along the line 5—5 during a subsequent insulating operation.
Figure 6:
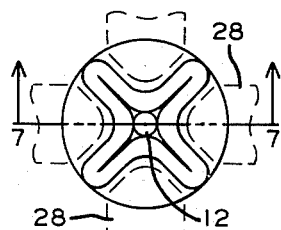
Fig. 6 is a bottom plan view of a portion of the embodiment shown in Fig. 1 during a final crimping operation.

During the final crimping operation shown in Fig. 6 solid electrolyte barrier layer 22 might be broken and bare portions of the anode might, therefore, be bridged or short-circuited by conductive particles incorporated within the cathode mixture. An insulating substance 32 may, therefore, be deposited as shown in Fig. 5 within the crimped or deformed portion of anode 14 to seal off any such breaks from the cathode mixture 18. A small pellet of silver chloride, for example, may be dropped into the deformed base of the cell which is then heated to fuse the insulating material over the bottom of the can. This, for example, forms a floor 32 above the crimped area to prevent the cathode mixture 18 from coming into contact with bare portions of the anode. Silver chloride is compatible with the solid electrolyte barrier and other constituents of cell 10 because it is identical to the advantageous silver chloride type of electrolyte barrier and bonds very tightly to silver cans or cup-shaped anodes to provide an effective seal over the deformed bottom of the cup-shaped anode. This AgCl seal is applied before tarnishing to prevent its heat of fusion from damaging the solid electrolyte barrier layer. A silver chloride insulating floor 32 is particularly advantageous in a cell incorporating a cathode mixture which contains chlorine.

Another effective insulating material is, for example, a deposit of the active constituent of the cathode material without any particles of conductive material included therein. For example, potassium tetrachloroiodide may be advantageously used to temporarily insulate the bottom of the can, particularly when it is also a constituent of the later added cathode mixture. This insulating substance is used, for example, when cathode material 18 (Fig. 7) is, for example, a mixture of $KICl_4$ with graphite and a binder such as Kel–F #90 grease. Kel–F #90 is the trademark for a product including oils and waxes compounded from low molecular weight polymers of chlorotrifluoroethylene which remains semi-solid between 0° and 350° F. A seal formed by $KICl_4$ is applied after tarnishing because it inherently repairs any breaks in the silver chloride barrier-electrolyte by its controlled liberation of chlorine. Furthermore, it also augments the supply of $KICl_4$ present in the cathode mixture, which supply is the life-determining factor of the cell during storage and use. The conductive particles, for example, of graphite in the cathode mixture can migrate or work down into the $KICl_4$ insulating floor to provide a maximum amount of active cathode mixtures within the cell.

Various insulating materials may also be used to form insulating barrier 32. It may be formed, for example, of a melted polymer wax or of a wafer of Teflon or Kel–F which is force-fitted within the cell above the crimped area.

The cathode mixture is, for example, conveniently packed within the cell by rolling the cathode mixture in rods of suitable diameter, freezing them to maintain them solid, slicing them off into lengths which suit the depth of the cells, and then inserting these preformed plugs of cathode material into the cells.

After cathode mix 18 is inserted within the cell, a seal or plug 20, for example of Teflon or Kel–F is inserted within the mouth 16 as shown in Fig. 8. Teflon is the trademark for a tetrafluoroethylene polymer, and Kel–F is the trademark for a thermoplastic polymer of chlorotrifluoroethylene. A plug 20 made of either of these substances effectively seals cathode material 18 within can 14 when it is assembled by means of a reasonably firm press fit. A conductive lead 12, for example, made of tantalum wire extends through a tight-fitting hole in plug 20 into electrical contact with cathode material 18. If plug 20 is inserted under compression, it will insure a close sealing fit between the plug 20 and anode cup 14 and lead 12 when it is allowed to expand against the wall of the cup.

After the can 14 is filled and sealed, as shown in Fig. 7, the final deforming operation shown in Fig. 6 is accomplished to firmly wedge or crimp lead 12 between indentations 30 in the base of the can. As previously mentioned, any barrier-electrolyte material initially present between the engaging portions of anode 14 and conductive lead 12 is squeezed out during final crimping which insures good electrical contact as well as firm physical retention. Since the crimping operation was partially completed before the barrier-electrolyte coating 22 was applied and before cathode mixture 18 was deposited and sealed within the can, any tendency to break coating 22 or to pop or force out plug 20 during the final crimping operation is minimized.

What is claimed is:

1. A series-connected array of battery cells comprising cup-shaped anodes, a solid barrier-electrolyte coating disposed upon said cup-shaped anodes, cathode material disposed within said cup-shaped anodes, a sealing means disposed within the open end of said cup-shaped anodes for confining said cathode material therewithin, a longitudinal indentation in the bases of said cup-shaped anodes, conductive leads extending through said sealing means into said cathode material, said conductive lead of a following cell being inserted within said longitudinal indentation of a preceding cell, the sides of said cup-shaped anodes adjacent said base being deformed radially inwardly towards each other at spaced intervals to form spaced radial indentations extending inwardly towards said inserted conductive lead, the portions of said cup-shaped anodes in line with said spaced radial indentations forcefully engaging said lead to securely anchor it therewithin, and said coating being squeezed out from between engaging portions of said anodes and said lead to provide good electrical contact therebetween.

2. A structure as set forth in claim 1 wherein an insulating material which is compatible with said solid electrolyte barrier layer is deposited within the deformed bottom of said cup-shaped anode between said cathode material and said solid electrolyte barrier layer.

3. A structure as set forth in claim 2 wherein said insulating material includes nonconductive portions of the active constituent of said cathode material.

4. A structure as set forth in claim 3 wherein said anode consists of silver and said insulating material consists of $KICl_4$.

5. A structure as set forth in claim 2 wherein said insulating material is identical to said solid electrolyte barrier layer.

6. A structure as set forth in claim 5 wherein said anode consists of silver, and said solid electrolyte barrier layer and said insulating material both consist of silver chloride.

7. A structure for a battery cell as set forth in claim 1 wherein two pairs of opposed spaced radial indentations are regularly spaced about the circumference of said base of said cup-shaped anode.

8. A method of forming a series-connected array of solid electrolyte battery cells having cathode material sealed within cup-shaped anodes with conductive leads extending through their sealed mouths into said cathode material, said method comprising the steps of longitudinally indenting the base of said cup-shaped anode, applying a solid barrier-electrolyte coating to said indented anode cup, inserting said cathode material within said anode cup and sealing it therewithin, inserting said conductive lead of a following cell within said longitudinal indentation of a preceding cell, radially deforming the walls of said cup-shaped anode inwardly at spaced intervals about said base to form spaced indentations which are brought into forceful contact with said conductive lead to squeeze out any solid barrier-electrolyte coating from between said lead and contacting portions of said anode to firmly secure said conductive lead in electrical contact within said radial indentations in said base of said anode.

9. A method as set forth in claim 8 wherein an insulating substance is inserted within the indented portion of said cup-shaped anode before said cathode material is deposited therein.

10. A method as set forth in claim 8 wherein said longitudinal indentation is made relatively shallow, rounded and covering approximately the entire area of said base.

11. A method as set forth in claim 9 wherein said insulating substance is applied in a manner which completely excludes said cathode material from the deformed portion of said cells, and said deformation is preformed in a single operation.

12. A method as set forth in claim 8 wherein said walls are preliminary radially deformed inwardly at spaced intervals about said bases before said cathode material is inserted within said anodes to form spaced radial indentations extending a distance towards each other sufficient to permit a conductive lead of a following cell to be inserted therebetween, and said spaced indentations are finally deformed inwardly into forceful contact with said conductive lead of a following cell after said cathode material is inserted and sealed within said anode with said conductive leads extending into it.

13. A method as set forth in claim 12 wherein said solid barrier-electrolyte coating is applied to said anodes after said preliminary radial deforming operation is accomplished to prevent said coating from being broken during any part of the deforming operation.

14. A method as set forth in claim 12 wherein said indented portion of said cup-shaped anode is heated after said insulating substance is deposited therein and before said solid barrier-electrolyte coating is applied to said anodes to fuse said insulating substance to the inner surface of said cup-shaped anode.

15. A method as set forth in claim 12 wherein said insulating substance is inserted after said solid barrier-electrolyte coating is applied.

References Cited in the file of this patent

UNITED STATES PATENTS

| | | |
|---|---|---|
| 520,429 | Hoggson | May 29, 1894 |
| 2,116,091 | Williams | May 3, 1938 |
| 2,666,800 | Hoynes | Jan. 19, 1954 |
| 2,702,309 | Oppenheim | Feb. 15, 1955 |
| 2,864,880 | Kaye | Dec. 16, 1958 |